United States Patent

[11] 3,571,685

[72] Inventors: Vaughn E. Akins;
John P. Harris; Frederick H. Kost,
Boulder, Colo.
[21] Appl. No.: 697,853
[22] Filed: Jan. 15, 1968
[45] Patented: Mar. 23, 1971
[73] Assignee: International Business Machines Corporation
Armonk, N.Y.

[54] NUMERICAL SERVO DISPLACEMENT CONTROL SYSTEM
4 Claims, 8 Drawing Figs.

[52] U.S. Cl. .................................................. 318/603, 318/375, 318/461
[51] Int. Cl. ..................................................... G05b 19/28
[50] Field of Search ........................................... 318/20.320 (Unofficial), 603, 375, 461

[56] References Cited
UNITED STATES PATENTS

| | | | |
|---|---|---|---|
| 2,537,427 | 1/1951 | Seid et al. | 318/20.320 |
| 2,727,194 | 12/1955 | Seid | 318/20.320 |
| 2,878,434 | 3/1959 | Brown | 318/20.320 |
| 2,926,335 | 2/1960 | Bower | 318/20.320 |
| 2,947,929 | 7/1960 | Bower | 318/20.320X |
| 3,206,665 | 9/1965 | Burlingham | 318/20.320X |
| 3,309,597 | 3/1967 | Gabor et al. | 318/461X |
| 3,328,658 | 6/1967 | Thompson | 318/375X |

Primary Examiner—T. E. Lynch
Attorneys—Hanifin and Tancin and Earl C. Hancock

ABSTRACT: The physical displacement of a movable medium is indicated by the content of a bidirectional counter. The counter is incremented or decremented by direction-oriented pulses relating to movement of the medium, these pulses being selectively gated into the counter. The content of the counter can control an operational amplifier to provide an indication of the position of the medium relative to a null point represented by any selected count in the counter.

3,571,685

INVENTORS
VAUGHN E. AKINS
JOHN P. HARRIS
FREDERICK H. KOST

BY Earl C. Hancock
ATTORNEY

NUMERICAL SERVO DISPLACEMENT CONTROL SYSTEM

CROSS REFERENCE TO RELATED APPLICATION

Application Ser. No. 423,671, filed Jan. 6, 1965, entitled "-Stepping Motor," by D. H. Cronquist and J. E. Shepard, which is assigned to the same assignee as the present application, relates to a numerical control system operating with stepper motor controls.

BACKGROUND OF THE INVENTION

1. Field of the Invention

This invention relates to digital apparatus for monitoring and/or controlling the displacement of a movable medium. More particularly, this invention relates to a system for monitoring bidirectional pulses indicative of the displacement of the movable medium and for producing an output signal proportional to the difference between the actual position of the medium and a selectable reference position for that medium.

The present invention is particularly useful for monitoring and/or controlling the movement of a strip-type material such as capstan-driven magnetic recording tape used in the data processing industry. By use of the present invention, interrecord gaps can be precisely controlled when recording data on a magnetic tape. The present invention also makes it possible to accurately stop magnetic tape movement at a desired point in the tape. All of the foregoing operations can be accomplished with the present invention with a high degree of repeatability.

2. Description of the Prior Art

The recording of data on a magnetic tape requires the inclusion of interrecord gaps or interblock gaps which demark the beginning and ending of different sequences of this data. The recording and reading control units operating with these magnetic tapes require that the tape drive be stopped within these gaps, both during reading and writing. In the past, the size of these gaps has been determined by measuring the amount of time required to stop the drive system from full velocity as well as the length of time required to start the drive system from a stopped condition to full velocity and adding an increment of time sufficient to allow for variations in starting and stopping the drive system. Typically, the drive system start and stop times plus the increment were used to determine the length of time required to be generated by a single shot-type circuit. That is, it was assumed that the drive system always took a fixed length of time to stop or start and reach full velocity and these times with a tolerance increment were used to determine the single shot timeout. The single shot was then used to control the gating of the read/write circuits.

The drive systems frequently used a prolay which squeezed the tape against a run or stop capstan and the prolay reaction time was the main factor in determining the interrecord gaps. Variations encountered in loading the drive system either required excessively long timeout periods or else variations in the length of the gaps had to be tolerated. In addition, the aging of components or the dissimilarity of components of material within given tolerances also dictated either excessive gaps or acceptance of varying gap lengths. It is inefficient and undesirable to allow a sufficient gap for all possible conditions that might be encountered, since the interrecord or interblock gaps will be of unnecessarily long lengths during which no useful information is stored.

Stepper motors have not provided sufficiently smooth full velocity to be useful for magnetic tape applications, because the stepper motor controls displacement by a sequence of pulses and has no constant velocity control. The faster pulses occur, the faster the motor will move. The problems are that the stepper motor is not capable of linear velocity or acceleration and deceleration, whereas controlled velocity is essential to proper magnetic tape operations. A continuous train of pulses is required to drive the stepper motor in addition and the drive systems are generally less economical than DC-type motor operation. Thus, even though digital control systems such as are shown in Application Ser. No. 423,671, as mentioned hereinbefore, have been developed, they are not applicable to the DC motor control and the tape control operations as is the present invention.

SUMMARY OF THE INVENTION

The present invention is a digital apparatus for accurately monitoring and/or controlling the position of a movable medium such as a magnetic tape for recording data. Upon command, the present invention will record bidirectional counts in a bidirectional counter which will indicate the actual position of the tape from a preselected null point or reference position by means of the contents of this bidirectional counter. The output of this bidirectional counter can be used as the input to an operational amplifier which, along with a biasing input thereto, produces an output signal that is a function of the difference between the actual position of the tape and the desired reference position.

In one embodiment of the present invention, a displacement indicating pulse generator, such as a two-phase phototransducer/tachometer configuration produces a series of pulses in a directionally oriented relationship. When the system of the present invention is commanded to monitor or control the tape displacement, these pulses are introduced to the bidirectional counter. The counter will contain an initial count when a command is first generated and will increment or decrement to the reference position which is typically some intermediary count between the full count capability of the bidirectional counter and a zero count thereof. The content of this bidirectional counter provides one input to the operational amplifier and the biasing voltage is a potential or current which is related to the intermediary count position and, thus, relates to the desired displacement positioning of the magnetic tape. When the content of the intermediary stage of the bidirectional counter produces a potential which nullifies the bias input to the operational amplifier, the operational amplifier will produce a signal that indicates that the tape has reached the desired position.

The output of the operational amplifier can be used merely to indicate the actual location of the tape relative to a reference position or can be used to directly control the driving system for the tape. Accordingly, the incrementing or decrementing of the bidirectional counter toward the reference position can produce a stepped control output voltage from the amplifier that could directly control a closed loop servo drive-type of motor operation. It should be noted that it is possible to vary the biasing potential so that the reference stage count in the bidirectional counter can be controlled separately. If the response of the motor system should lag too far behind the present invention, the counter will indicate a failure to stop at the null point and actually produce a correction voltage which will cause the motor to return to that null point. The generation of a gate signal from the counter when it has reached full count or zero count after a start signal has been generated will always occur after a fixed displacement of the tape has passed and, thus, the interrecord gap or interblock gap generated by the present system will be of a fixed length.

An object of the present invention is to provide a means for monitoring and/or controlling the physical displacement of a movable medium.

Yet another object of the present invention is to provide accurate positioning of a movable medium in a manner which is directly related to the movement of that medium.

Still another object of the present invention is to provide selectable monitoring of the difference between the actual position of the tape and the desired position thereof.

A further object of the present invention is to provide a system which, upon command, can determine and/or control the position of a movable strip-type medium with respect to a selectable reference position.

The foregoing and other objects, features and advantages of the present invention will be apparent from the following more particular description of the preferred embodiment of the invention as is illustrated in the accompanying drawings.

DESCRIPTION OF THE PREFERRED EMBODIMENT

Figure 1:
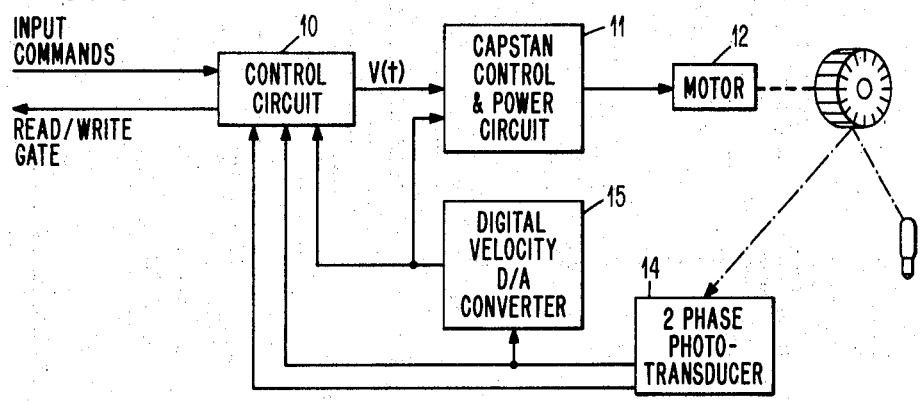
FIG. 1 is an overall block diagram which shows the relationship of the present invention to a capstan drive configuration particularly useful for a tape drive control operation.

FIG. 1 illustrates an overall block diagram of an application of the present invention to a tape drive control, although it is to be understood that the present invention is not intended to be limited to this particular application. The control circuit 10 provides an output signal to the capstan control and power circuit 11 which, in turn, provides command signals to a low inertia, high torque motor which typically might be a printed circuit-type device. In all drive systems, particularly as used in magnetic tape control, the start/stop characteristics produce a repeatability distribution because they are physical systems subject to external disturbances, load variations and parametric degradation. In general, the problem with tape drive systems is to stop the tape within the interrecord gap in such a position that it can be started in either direction and obtain terminal velocity before reaching the edge of the gap. In the time delay system of the past, it was difficult to choose an optimum time delay and still maintain the system so that it could perform reliably without excessive waste of time and tape-recording surface. This was particularly critical since the time delays had to be determined empirically, but still had to include sufficient tolerances to accommodate the variations in machine parameters and environment. The present invention provides sufficient time delay to insure that the motor drive is stopped at the position desired and is at full velocity with a constant interrecord gap of minimal length. Because of the accurate displacement-oriented feature of this invention, any given tape drive can be operated at its own optimum reaction time to computer-originated control signals. In multiple tape drive configurations, the prior art required a delay from the time the command signal is generated to the time of actual tape operation that would accommodate the slowest tape drive.

The present invention, as shown in FIG. 1, by means of the control circuit 10 effects accurate controlling of the motor positioning, although it can be as easily used merely to monitor the position of the tape. The particular block 10 shown in FIG. 1 is shown in greater detail in FIG. 2 and will be described later herein. The input command to control circuit 10 can be generated from a computer or could be automatically generated by other circuitry of the tape control unit, or both. When a stop command has been introduced to 10, pulsed data from the two-phase phototransducer 14 will begin to be accepted by a bidirectional counter in control circuit 10. The pulses generated by transducer 14 originate from light reflected off of a tachometer disc in the embodiment shown and essentially monitor the capstan rotation under control of motor 12. The counts contained in the bidirectional counter in control circuit 10 is digital to analogue converted and algebraically summed in an operational amplifier to produce the control signal $V(t)$ to provide the control input signal to capstan control circuits 11. That is, as the bidirectional counter is incremented or decremented toward a given reference, the control voltage $V(t)$ will diminish as a function of the movement of the capstan and, thus, the displacement of the magnetic tape until ultimately the motor will reach the null position wherein the control voltage is zero. As will be further understood hereinafter, control circuit 10 will provide inherent center point locking by utilization of the two-phased transducer 14 signal to determine both the direction of rotation and the ability of the register to count in either direction. If disturbed, the system seeks its only stable state, which is the lock point or null state.

When an input command indicating that a start is to be commenced in either direction, control circuit 10 applies the full terminal velocity signal to capstan control circuit 11 to obtain maximum acceleration. The bidirectional counter or register within control circuit 10 continues to count and, upon reaching a full or empty state, indicates that the edge of gap has been reached. This information is ANDed with a signal from block 15, representative that terminal velocity has been reached to provide a read/write gate to the tape control unit. This asynchronous approach can optimize and hold constant the length of an IRG and minimize access time for each operation. It is not affected by the length of time that a given drive system requires to reach zero velocity and requires no restrictions on the direction of entry or exit. The pulsed outputs from transducers 14 are digital to analogue converted in 15 and introduced to capstan control and power circuit 11 to be compared against the velocity related control voltage $V(t)$. Thus, circuit 11 controlling motor 12 which provides tachometer-type feedback through transducers 14 and converter 15 is a typical closed-loop servo feedback system and, therefore, will not be described in greater detail herein.

Summarizing the operation of FIG. 1 circuitry, the introduction of a start command to circuit 10 will cause a voltage to be applied to power circuits 11 to effect acceleration and full velocity of motor 12. By means of the tachometer and the operation of transducer 14 and converter 15, the power circuit 11 will maintain full terminal velocity of motor 12 in a normal servo loop operation. When an appropriate command is introduced to control circuit 10, the pulses from transducer 14 will be sensed as to the direction thereof and counted in a bidirectional counter. This bidirectional counter will provide an indication of the displacement of the magnetic tape from a reference point which can also be introduced to control circuit 10 or can be a fixed reference point. That is, when the control circuit 10 is gated so as to commence accepting bidirectional pulses from transducer 14, the content of the bidirectional counter will indicate the distance or physical displacement of the tape from a reference point. This reference point would normally be represented by an intermediate count contained in the counter. The output of this counter could be used merely to indicate the physical location of the tape or could be used to directly control the stopping and/or starting of the capstan drive motor which is the manner of operation for the configuration shown in FIG. 1.

Figure 3:
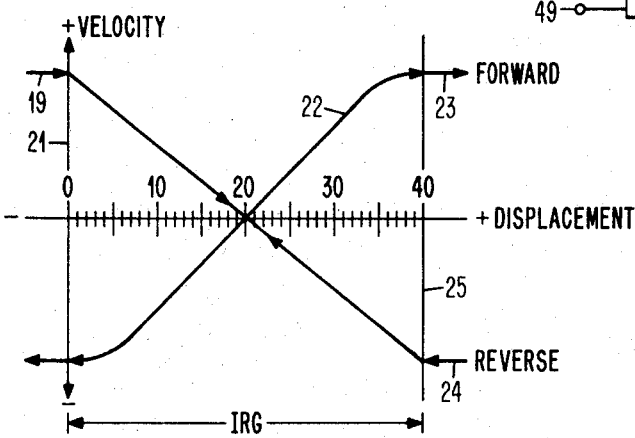
FIG. 3 is a graph of motor velocity against the displacement of a magnetic tape and particularly shows the response of the present system in providing a controlled interrecord gap.

FIG. 3 is a correlation of a motor velocity as against the physical displacement of a magnetic tape, particularly showing the relationship thereof to a given interrecord gap (IRG). Thus, line 19 indicates that the motor is at full forward velocity until a stop command has been generated at reference line 21. The motor velocity will then decline until it reaches the center or count twenty of the interrecord gap, the gap, for purposes of this example, being the equivalent of forty pulses from phototransducer 14. When a forward start signal is generated after the motor has stopped at the equivalent of transducer pulse twenty, the motor will accelerate such as is shown at line 22, until it has reached full terminal velocity by the time that transducer pulse forty has occurred. Thereafter, the full term velocity 23 which is the same as velocity 19 will continue movement of the tape. The converse applies to reverse velocity 24 for which a stop command would be received at reference line 25. It should be noted that the end of the gap occurs at reference line 25 for the forward velocity, whereas the end of the gap occurs at reference line 21 for the reverse velocity.

Figure 2:
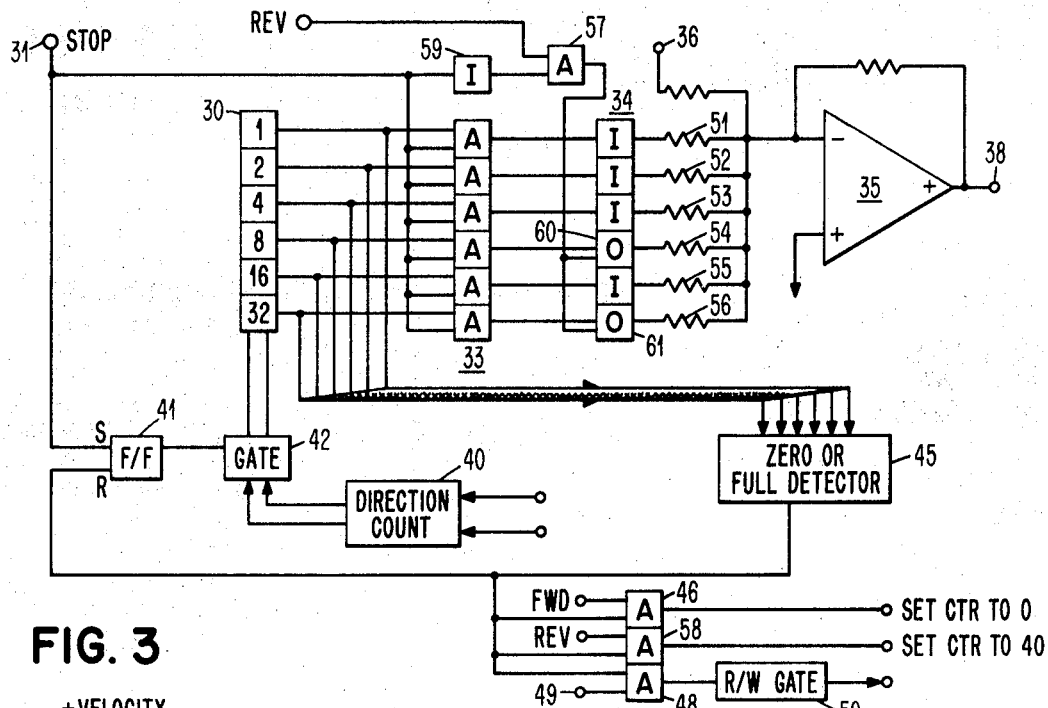
FIG. 2 shows a more detailed circuit diagram of the control circuit shown generally in FIG. 1.

The actual implementation of circuitry to provide the function shown for control circuit 10 in FIG. 1 can be better understood from the circuit diagram shown in FIG. 2. When power is initially applied to the control system, as shown in FIG. 2, any arbitrary count may be present in bidirectional counter 30. With the introduction of power to the system, a stop command is automatically introduced to terminal 31. As a result, the count contained in bidirectional counter 30 will be passed through AND circuits 33 and the appropriate coupling logic circuits 34, which are composed of inverter or OR circuits, to be summed as an input to operational amplifier 35. This summation is compared against an offset or biasing input introduced to terminal 36 which signal is a function of the desired reference displacement of the tape. The differences between the content of bidirectional counter 30 and biasing potential at 36 will cause operational amplifier 35 to produce an output at terminal 38 which will be the voltage $V(t)$ which is introduced to the capstan motor. The motor therefore will begin to move in the direction indicated by the output at 38 and cause the tachometer pulses to be introduced to direction count circuit 40.

The initial occurrence of a stop signal at 31 will cause the flip-flop or latch-type circuit 41 to be set, thus gating or conditioning gates 42 so as to pass the pulses from direction count 40 into bidirectional counter 30. As will be more fully appreciated from the description hereinafter for FIG. 5, the output of direction count 40 will be a sequence of pulses that is related to the direction of movement of the motor and will cause counter 30 to increment or decrement, depending upon the displacement of the tape from the reference position. Thus, counter 30 will begin to fill or empty until it produces an output to be summed into amplifier 35 so as to directly offset the biasing potential at 36 and produce a zero output at 38, at which time the motor will cease movement.

The input command which indicates that the tape is to begin movement will result in the dropping of the stop signal at terminal 31 and will be accompanied by either a reverse ("Rev") or forward ("Fwd") signal, both of which are relatively constant signals indicating the direction of rotation that the motor is to take. Assuming that a forward start signal has been received, the AND circuits 33 will all be deconditioned and, therefore, the output of circuits 34 will be forced to an all-zero output. Counter 30 actually would not contain a zero count at this time, but the absence of outputs from circuits 34 will cause operational amplifier 35 to produce an output signal at 38 which will cause the capstan motor to accelerate to full forward velocity and maintain that speed.

Although the output of bidirectional counter 30 is blocked from operational amplifier 35 by the deconditioning of AND circuits 33, flip-flop circuit 41 has not been reset and, therefore, gate 42 will permit the pulses from 40 to continue to increment counter 30. Ultimately, counter 30 will be incremented to a full 40 count in this example, at which time zero or full detector 45 will produce an output signal that will reset flip-flop 41 and decondition gate 42. Since the forward signal is already present, the output from detector 45 will complete the conditioning of AND circuit 46 which will, by well-known logic not shown, cause bidirectional counter 30 to be reset to zero content.

In addition, the occurrence of an output from the forty counts detected at 45 will provide one conditioning input for AND circuit 48. The other input for AND circuit 48 is a signal which is introduced to terminal 49 from the digital speed-related D/A converter 15, shown in FIG. 1, which indicates that the motor is at full velocity or within acceptable tolerances thereof. Thus, the output from detector 45 will indicate that the end of the gap has been reached and, since the velocity of the motor will be at terminal or full velocity at this time, a read/write gate 50 will provide an output indicating that data can be read or written relative to the tape. It should be noted that if accurate control of the interrecord gap is desired, logic could be included to insure that the full velocity of the drive motor was reached at terminal 49 before the output of detector 45 had occurred or else an error indication could be generated at that time.

Figure 4:
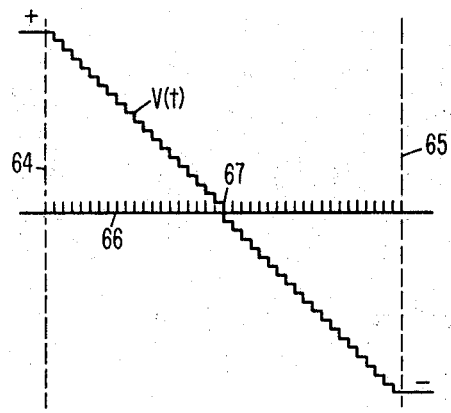
FIG. 4 is a voltage/time diagram showing the manner in which the capstan control voltage could be controlled in accordance with the present invention.

Assuming that full velocity is maintained, no further events would occur relative to the circuitry of FIG. 2. However, whenever it is desired to determine how far from a given reference count the tape is or if, as is shown in the preferred embodiment described herein, it is desired to stop the movement of the motor, a stop command would be generated at terminal 31. As a result, AND circuits 33 would be conditioned and initially operational amplifier 35 would see no difference from the prior full forward velocity operation, since the content of bidirectional counter 30 has already been set to zero. However, flip-flop 41 would be set, conditioning gates 42 and pulses would begin to increment bidirectional counter 30. As a result, the output of logic circuits 34 would be summed against the offset bias voltage at terminal 36, which would cause operational amplifier 35 to begin to reduce the command signal at terminal 38 for the motor control as can be seen in FIG. 4. It should be noted that resistances 51—56 would be weighted in inverse proportions to the binary value of the associated stages in binary counter 30. That is, if resistance 56 should have a value of 1 ohm, then resistance 51 would have a value of 32 ohms and resistances 51—56 would have resistive values in inverse binary relations to the count of the stages in 30.

If the motor should not actually be capable of stopping when the count contained in counter 30 is equivalent to the bias 36, then counter 30 would continue to count pulses which indicate displacement of the tape beyond the lock point or null position. Therefore, a reverse driving potential actually would be produced, since counter 30 would be producing a potential greater than necessary to offset the bias at 36 and, thus, amplifier 35 would produce an output signal to cause the motor to reverse direction until the count contained in counter 30 equals the bias at terminal 36. As compared with the FIG. 3 circuitry in the example presently being described, it should be appreciated that the count at which counter 30 will offset the bias at potential 36 would be the equivalent of a 20 count, or a "one" in stages four and 16 of counter 30, with all other stages at zero. It should also be noted that a full count would be detected by detector 45 when a "one" was present in stages 32 and eight of counter 30, while stages one, two, four and 16 all contain zeros.

If the motor were to be started with a reverse direction of rotation, the stop signal at 31 would be removed and a reverse signal "Rev" would be introduced to AND circuits 57 and 58. Since the control logic has dropped the input to 31, inverter circuit 59 will cause AND circuit 57 to be completely conditioned and, therefore, force an apparent full or 40 count through OR circuits 60 and 61 which will cause operational amplifier 35 to introduce a full reverse potential to the motor. Once again, AND circuits 33 will be deconditioned so that the count contained in counter 30 will not be sensed by amplifier 35, but gate 42 will be conditioned and the pulses being received from 40 will cause counter 30 to decrement toward zero. When the counter 30 has been completely emptied, detector 45 will once again produce an output signal which will reset flip-flop 41 and complete the condition of both AND circuits 48 and 58. If the motor has reached full velocity, as would be signified by a signal being present on terminal 49, a read/write gate 50 would be generated to show that the end of the gap had been reached and the motor had reached full velocity. In addition, the output of AND circuit 58 would cause the counter 30 to contain a count equivalent to 40 by means of logic circuitry which is not shown, but which will be readily understood by those having normal skill in the art. Therefore, when the stop signal is introduced in the reverse direction, counter 30 will be gated into control of operational amplifier 35 and will begin decrementing from the 40 count toward the 20 count which will offset the bias at terminal 36 and cause the motor to come to a stop. This is shown in the lower portion of FIG. 4.

It should be understood that a fixed bias potential can be introduced at 36 which is directly related to a given count in counter 30 or a selectable potential can be so applied if desired. In the example given, a potential would be introduced to 36 which would correlate with the equivalent of a count 20 in bidirectional counter 30, whether this potential is originated in hardware or is program-generated, since it is assumed that the interrecord gap desired is always to be of the equivalent of 40 tachometer pulses in width. However, if it should be desired to vary the width that is being utilized, the potential at 36 could be varied accordingly. In addition, logic circuits 34 could all be of the OR circuit variety and could be programmed to force any desired count for a full reverse speed, if this should be needed. However, an increase in the output count and intermediary null count would involve an appropriate increase in the full forward or reverse motor velocity unless limiting circuitry were added. Conversely, a decrease in output count and null point bias would decrease the full motor velocity. Normally, the introduction of a change in the total full count capability of the FIG. 2 circuitry would be accompanied by an appropriate change in the bias 36 level in order to maintain the same velocity for full forward or reverse operation. However, if a fast rewind should be desired, for example, it is possible to modify FIG. 2 so that only an increased full count would be introduced when needed.

The invention as described can be used with a motor that fails to respond with sufficient speed to stop at the null point, since it does bring to the motor back to the lock point if it should overshoot, as is discussed hereinabove. In addition, the system shown and described is adaptable by means of this null-seeking technique to provide variable interrecord gaps, if desired, or could even be utilized to operate with a system in which the interrecord gap approaches zero width. The stop signal introduced at terminal 31 for a write operation would be generated by the tape control unit or a computer, or both. For a read operation, the information which indicates that the end of block or end of record has been reached would cause the tape control unit to generate the stop signal. Typically, this end of block is signified on the tape by a special tape character.

The particular bidirectional counter which is utilized is a matter of design choice to a persons having normal skill in the art. For instance, a bidirectional counter which could be easily adapted to operate with the outputs of the direction count circuit 40, which will be described in greater detail hereinafter for FIG. 5, can be found in the Aug. 16, 1967, issue of the Electronic Design magazine, at page 66. The operational amplifier 35 is also of a standard design and typical examples of this circuitry can be found in the "Applications Manual for Computing Amplifiers," by Philbrick Researches, Inc. (Nimrod Press, Inc., Boston, Mass., 1966) in FIG. 2.3(b) on page 41 and FIG. 3.30 on page 79, with the associated descriptive material. Vacuum tube operational amplifiers are shown in the "Electronic and Radio Engineering" reference book by Terman, 4th Edition (McGraw-Hill, 1955) in FIG. 18—49 on page 664.

The envelope of the control voltage $V(t)$ as is generated by FIG. 2 circuitry is illustrated with respect to tape displacement in FIG. 4. That is, the edges of the interrecord gap are shown generally at 64 and 65 and the capstan pulses are shown horizontally along reference line 66. As the stop signal is given at 64 when the motor is at full velocity in a forward (+) direction, each capstan spike or pulse along reference line 66 will cause the counter 30 to increment by one and, therefore, produce a reducing step in the velocity envelope as shown until it approaches the center point 67. Conversely, if the motor were at full velocity in a reverse(−) direction and the stop signal were given at 65, the counter would be decremented from the full 40 count until it has been stepped to the lock point 67.

As mentioned hereinbefore, the two-phase transducers of FIG. 1 produce output pulses which are converted to direction-oriented pulses in the direction count detector circuit 40 shown in FIG. 2. The operations performed by direction count circuit 40 in the past have traditionally been accomplished by a simple latch configuration sensitive to the first-occurring pulse. However, a basic deficiency exists in these systems which results in a ambiguity in responding to the first information received subsequent to a change of motor direction or during oscillation of the motor about a point. If accurate gap control is to be maintained, the output count from detector 40 must be a true directional displacement indicator. Otherwise, as will be clarified hereinafter, the count contained in the bidirectional counter will either cause the motor to creep or step out of position if the circuitry is being used to control the motor, or else may contain a count which does not accurately reflect the actual position of the tape.

To understand the problem, the traditional techniques for indicating directional pulse counts from a two-phase transducer output will now be described. Assuming that the dual outputs of the two-phase tachometer are A and B, the rise of pulse A preceding the rise of pulse B in the prior art would set a "forward" latch and this latch, plus the subsequent concurrence of both pulses A and B, indicates that one forward increment of motion has occurred. It naturally follows that the opposite sequence would indicate one increment of backward motion.

Figure 6A:
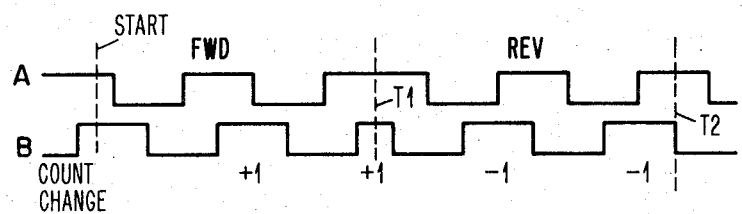
FIGS. 6 (A, B & C) are a time-base diagram relating to the operation of the bidirectional pulse generating circuitry illustrated in FIG. 5.

FIG. 6A illustrates the proper operation of a prior art latch-type detector circuit. That is, it will be noted that for the first half of FIG. 6A the motor is moving in the forward direction and pulse A is occuring 90° ahead of pulse B. The occurrence of pulse A followed by pulse B would cause a recording of a plus one count and, at time T1, a second positive count would be stored, indicating that the motor has displaced the tape by two positions. At time T1, the motor reverses direction and begins moving so that the B pulses occur 90° ahead of the A pulses. As a result, two consecutive counts are encountered which would decrement the counter to indicate that the tape has returned to the zero position at time T2, which is correct.

Figure 6B:
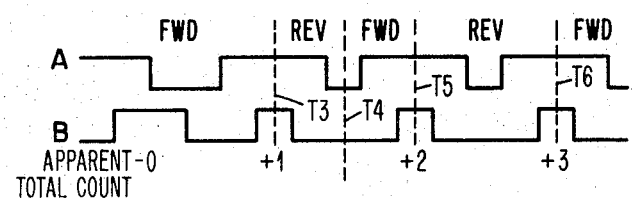
Figure 6C:
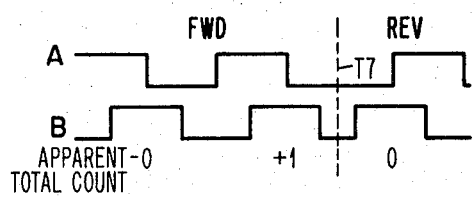

However, FIGS. 6B and 6C indicate circumstances wherein an erroneous count can be recorded and accumulated. More specifically, FIG. 6B shows motion of the motor in a forward direction and the recording of an apparent count of plus one at time T3, which is correct. However, if after T3 the motor reverses rotation and moves sufficiently for A and B to recover and, before moving far enough to decrement the count, again reverses at time T4 to start in a forward direction, the rise pulse A will precede the rise of pulse B so that an apparent second count would be recorded at time T5. However, if the actual physical displacement of the tape is considered, it would be recognized that the tape is actually still at the first count position at time T5 and not at the second count position as is indicated by the prior art latches. This cycle could be again repeated so that yet another pulse count would be detected at time T6, and so forth. It should be apparent that, even at time T6, the motor still has actually only displaced the tape to the first position even though the apparent total count that has been accumulated indicates that the tape has moved three positions. If the detection circuitry is being used to control the positioning of a motor, the motor actually would have been decremented and moved backward to bring the apparent total count back to one, assuming one is the desired position, although the actual displacement of the tape under these circumstances would be two counts negative from this one position.

Yet another apparent count condition which is erroneous is shown in FIG. 6C. In FIG. 6C, the motor has moved in the forward direction and recorded the first count, which is correct. Immediately after the recovery of A and B, however, the motor reverses direction at time T7. Although the counter will decrement the apparent total count to zero when the pulses A and B are both up following time T7, the actual physical displacement that has resulted is that the motor has simply returned to the plus one position. Therefore, the apparent total count is displaced by one position and is in error. Once again, if the motor is being controlled by a pulse-sensing circuit, it would have been incremented back to the one position if that were desired. It should also be noted that both for FIG. 6B and FIG. 6C, if circuitry such as is shown in the present invention were to be used merely for monitoring purposes, the apparent position of the tape as shown by the counts from the detectors would be indicating an erroneous position. That is, for FIG. 6B, the monitoring count would indicate that the tape had moved three positions at T6 when, in fact, it had only moved one; and for the FIG. 6C the monitoring count would indicate that the tape was at the zero position when, in fact, it was at the first or plus one position.

Figure 5:
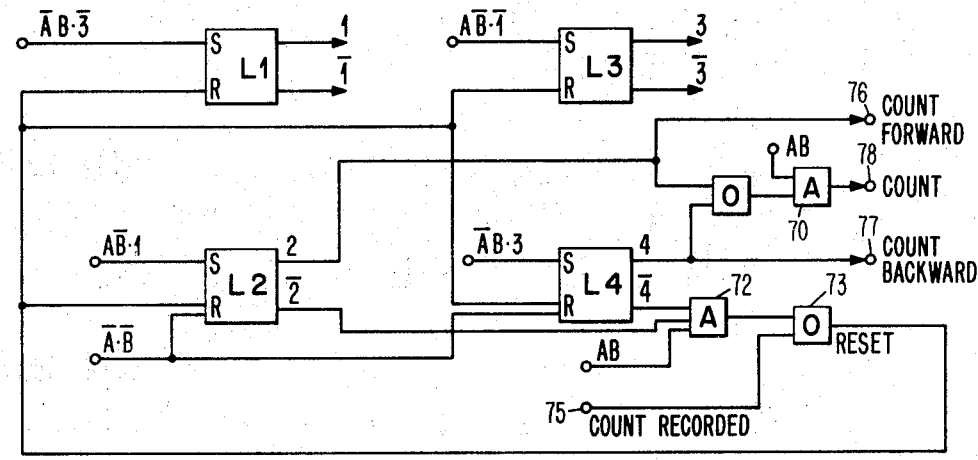
FIG. 5 is a circuit diagram of a direction detection system which could provide bidirectional counting pulses from a two-phase phototransducer/tachometer.

The resolution of these ambiguities is corrected by the circuitry shown in FIG. 5. The FIG. 5 circuitry is arranged for the purpose of ignoring the false first displacement count following a direction reversal and for insuring that actual displacement has occurred before a count is incremented or decremented. That is, the FIG. 5 circuitry is logic for the purpose of providing a fail-safe directional displacement detection. The circuitry essentially employs four latches L1—L4 which are gated so that when, in fact, a condition occurs which would have traditionally caused a positional error, this circuitry is not subject to indicating erroneous count. The FIG. 5 circuitry is arranged so that a forward count will be recorded only when the absence of an A pulse and the presence of a B pulse is followed by an A pulse without a B pulse condition, which is, in turn, followed by the presence of both A and B pulses. That is, when the B pulse rises before the A pulse and, ignoring the not A and not B states, when this is followed by an A pulse at the same time that there is no B pulse and when this condition is yet again followed by concurrent A and B pulses, a forward count will be recorded. Conversely, a reverse count will be recorded when an A pulse occurs without a B pulse followed by a B pulse without an A pulse, followed by concurrence of A and B pulses.

It should be noted that the concurrence of A and B pulses will always attempt to record a count in the FIG. 5 circuitry as it would have in the prior art latch arrangements. However, whenever the A and B pulses concur with neither latch 4 nor latch 2 being set, a "no count" condition will result and the circuitry will be reset. That is, a count forward indication will be produced by the FIG. 5 circuitry only when latch L2 is set, whereas a count backward indication will only be recorded when latch L4 is set. Even though either one of these latches is set, no actual count will be recorded unless the setting of such latch is followed by the occurrence of both A and B pulses simultaneously. This would result in the complete conditioning of AND circuit 70. Thus, the existence of a count signal out of AND circuit 70 and either a count forward or a count backward pulse result in the appropriate count being stored in the bidirectional counter. However, if neither latches 2 nor 4 are set, the occurrence of a concurrent A and B pulse will completely condition AND 72, which will provide a reset signal through OR 73 to reset all latches. It should be noted that the actual recording of a count will effect a count recorded signal at 75 and also reset the circuitry.

Latches L2 and L4, set, will be reset by the simultaneous absence of A and B pulses. A false count could be recorded if L2 or L4 were set and a turnaround occurred, followed by a concurrence of A and B. The aforementioned resetting of latches L2 and L4 prevents recording of this false count.

The sequence of logical statements which will effect concurrence of either a count forward of a count backward pulse at either terminal 76 or 77, along with a count pulse at terminal 78 are as follows:

$\overline{A}B \rightarrow A\overline{B} \rightarrow AB =$ Fwd. count and reset $A\overline{B} \rightarrow \overline{A}B \rightarrow AB =$ Rev. count and reset The logical statements which will block recording of a count and reset all latches are:

$AB \cdot \overline{2} \cdot \overline{4} =$ Reset (no count)

$A \cdot B \,(4+2) =$ Reset (no count)

In these logical equations, the arrows indicate the sequence of pulses. In FIG. 5, the logical conditions which set latches L1—L4 are shown associated with the set inputs thereto. For instance, latch L1 is set by the concurrent occurrence of a B pulse without an A pulse and the fact that latch L3 is in the reset condition. To simplify the connections of the circuitry shown, the set and not outputs for latches L1 and L3 are not shown connected, but their operational statements as logical functions are shown. That is, the set or one output of latch L1 is used as one condition to be ANDed with the presence of an A pulse and the absence of a B pulse to set latch L2, whereas the absence of a L1 output or a reset output ($\overline{1}$) is used in conjunction with this same pulse sequence to set latch L3. The set output of latch L3 (3) is used to concur with a B pulse without an A pulse to set latch L4, whereas the reset output of latch L3 is used to concur with this same AB sequence to set latch L1. The fact that either latch L2 or L4 is set will result in AND circuit 72 being deconditioned so that the only reset for the circuitry will be provided as the input to 75 when the bidirectional counter actually accepts the count indicated at terminals 76—78. Because of the logic circuitry delays involved, it should be apparent that the direction of count as indicated at terminals 76 and 77 will always precede the actual occurrence of a count at terminal 78. The conditions which could cause recording of false counts, as are illustrated in FIGS. 6B and 6C, can be compared against the operation of the FIG. 5 circuitry and it will be found that only the accurate position-reflecting counts will be produced thereby.

The present invention is not restricted to this particular type of circuitry of the detection and count direction indicating operation as shown in FIG. 5. The FIG. 5 circuitry is merely shown to indicate a more accurate operation if close tolerances of the gap controls and displacement indications is desired.

Although the foregoing preferred embodiment has been shown using a light source and a two-phase phototransducer for generating the pulses to be utilized by the bidirectional counter, it will be understood by those having normal skill in the art that there are many ways of generating these pulses. For instance, a two-phase magnetic rotor type tachometer could be used. In addition, where the invention is implemented for magnetic tape operations or the like, a special pulse producing track on the tape could be utilized.

There will be many other modifications, uses, and applications of the present invention which will be readily apparent to those having normal skill in the art. While the invention has been particularly described and shown relative to the foregoing embodiment, it will be understood by those having normal skill in the art that various other changes and modifications may be made without departing from the spirit of this invention.

What is claimed is:
1. A system operable with a movable strip-type medium comprising:
   1. means for producing pulses indicative of direction of movement and displacement of said medium;
   2. a bidirectional counter responsive to said pulses to meter displacement;
   3. gating means for selectively coupling said pulses to said counter;
   4. an operational amplifier;
   5. converting means responsive to said counter for supplying an analogue signal indicative of the count in said counter to said operational amplifier;

6. means for biasing said amplifier with a signal of opposite polarity but of a magnitude representative of a predetermined count;
7. means for actuating said gating means such that said analogue signal is indicative of the physical displacement of the medium from a position corresponding to the magnitude of the signal from said biasing means;
8. motive means including a motor for positioning said medium and connected to said amplifier for being actuated thereby;
9. deconditioning means for deconditioning said converter to actuate said motor at a speed proportional to the magnitude of the signal from said amplifier as caused by said biasing means and said motive means being controlled by the numerical contents of said counter whenever said converter means and said gating means are simultaneously actuated;
10. means operable with said deconditioning means for selectively forcing said converter means to supply a signal to said amplifier for causing said motive means to move in a direction opposite to that effected by the biasing means signal;
11. means for causing said counter to continue counting pulses after operation of said deconditioning means at least until said counter contains a preselected count; and
12. means for indicating that said preselected count is in said counter.

2. Apparatus in accordance with claim 1 wherein:
said preselected count is either a full count or a zero count in said counter, and which further includes means responsive to said indicating means for causing a full count to be placed in said counter whenever a zero count is indicated as present therein and for placing a zero count in said counter whenever a full count is indicated as present therein.

3. Apparatus in accordance with claim 2 which further includes:
means responsive to an output from said indicating means for deconditioning said gating means, said gating means and said logic coupling means being reconditioned whenever said motor is to be brought to a stop at a displacement position corresponding to the signal introduced by said biasing means.

4. A tape motion control system, including the combination:
1. motive means for selectively moving a tape and including a tachometer for supplying pulses indicative of direction of motion and displacement;
2. a bidirectional counter responsive to said pulses to meter displacement;
3. logic coupling means interposed between said counter, said motive means including biasing means for supplying a signal indicative of a predetermined count in said counter but of opposite sign and operative to supply an analogue signal indicative of the count in the counter for actuating said motive means;
4. control means including gating means for selectively passing pulses to said counter and simultaneously deconditioning said logic-coupling means such that said bias signal is supplied to said motor whenever said gating means are not actuated and when said gating means are actuated to supply said analogue signal indicative of said count to said motor in combination with said bias signal, such that said motor tends to move a given displacement in accordance with the magnitude of said bias signal; and
5. further means for causing said counter to accept pulses for counting after operation of said control means until said counter contains a preselected count.